United States Patent
Jung et al.

(10) Patent No.: US 7,463,324 B2
(45) Date of Patent: Dec. 9, 2008

(54) LIQUID CRYSTAL DISPLAY PANEL OF LINE ON GLASS TYPE

(75) Inventors: Yong Chae Jung, Kumi-shi (KR); Soon Dong Cho, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/319,672

(22) Filed: Dec. 16, 2002

(65) Prior Publication Data

US 2003/0117567 A1    Jun. 26, 2003

(30) Foreign Application Priority Data

Dec. 20, 2001   (KR) .............................. 2001-81563

(51) Int. Cl.
    *G02F 1/1345* (2006.01)
(52) U.S. Cl. ...................... 349/149; 349/151
(58) Field of Classification Search .......... 349/148–152
    See application file for complete search history.

(56) References Cited

U.S. PATENT DOCUMENTS 6,806,938 B2 * 10/2004 Asakura et al. ............. 349/151

2002/0093616 A1 * 7/2002 Park et al. ................... 349/149
2003/0038904 A1 * 2/2003 Kaneko et al. .............. 349/110

FOREIGN PATENT DOCUMENTS

WO         WO99/52011    * 10/1999

* cited by examiner

*Primary Examiner*—Dung T. Nguyen
(74) *Attorney, Agent, or Firm*—McKenna Long & Aldridge LLP

(57) ABSTRACT

A LOG liquid crystal display panel that is adaptive for reducing a line resistance of LOG signal line groups within a confined area. The picture display part within the panel has a plurality of liquid crystal cells arranged at the crossing between gate lines and data lines. Line-on-glass signal lines are provided at an outer area of the picture display connecting integrated circuits to each other and for applying driving signals required for driving the gate lines. The line-on-glass signal lines are separately provided at different substrates opposed to each other having a liquid crystal disposed therebetween.

6 Claims, 4 Drawing Sheets ary to a liquid crystal display panel of line on glass (LOG) type that is adaptive for enlarging a section area of a line on glass type signal line group within a confined area.

LIQUID CRYSTAL DISPLAY PANEL OF LINE ON GLASS TYPE

This application claims the benefit of Korean Patent Application No. P2001-81563, filed on Dec. 20, 2001, which is hereby incorporated by reference for all purposes as if fully set forth herein.

BACKGROUND OF THE INVENTION

1. Field of the Invention

The present invention relates to a liquid crystal display, and more particularly to a liquid crystal display panel of line on glass (LOG) type that is adaptive for enlarging a section area of a line on glass type signal line group within a confined area.

2. Discussion of the Related Art

Generally, liquid crystal displays (LCDs) use an electric field to control light transmittance characteristics of liquid crystal material. Accordingly, LCDs typically include a liquid crystal display panel having a plurality of liquid crystal cells arranged in a matrix pattern and a driving circuit for driving the liquid crystal cells to display a picture on the liquid crystal display panel.

The plurality of liquid crystal cells are arranged on the liquid crystal panel at locations where gate lines cross data lines. Electric fields may be applied to the layer of the liquid crystal material with a pixel and common electrodes arranged on the liquid crystal display panel. Each pixel electrode is connected to a data line via source and drain electrodes of switching devices, such as thin film transistors. Gate electrodes of each of the thin film transistors are connected to corresponding gate lines and allow pixel voltage signals to be selectively applied to corresponding pixel electrodes.

The driving circuit includes a gate driver for driving the gate lines, a data driver for driving the data lines, a timing controller for controlling the gate driver and data drivers, and a power supply for supplying various driving voltages used in the LCD. The timing controller controls the gate and data drivers by controlling a driving timing of the gate driver and data drivers and by applying pixel data signals to the data driver. Driving voltages generated by power supply include, for example, common voltage (Vcom), gate high voltage (Vgh), and gate low voltage (Vgl). The gate driver sequentially applies scanning signals to the gate lines to sequentially drive the liquid crystal cells within the liquid crystal display panel one line at a time. The data driver applies data voltage signals to each of the data lines whenever a gate line receives a gate signal. Accordingly, LCDs control transmittance characteristics of liquid crystal material using electric fields applied to pixel and common electrodes in accordance with pixel voltage signals specific to a liquid crystal cell to display an image.

Data and gate drivers are directly connected to the liquid crystal display panel and are provided as a plurality of integrated circuits (ICs). Each of the gate driver ICs and data driver ICs are mounted to the liquid crystal display using tape carrier package (TCP) or chip on glass (COG) techniques. Further TCP-type gate and driver ICs are connected to the liquid crystal display panel via a tape automated bonding (TAB) technique.

The TCP-type driver ICs are connected to the liquid crystal panel by the TAB technique and receive control signals and direct current (DC) voltage signals transmitted from over signal lines on a printed circuit board (PCB). For example, each of the data driver ICs are connected to each other via signal lines mounted in series on the data PCB, receive control signals from the timing controller, and receive pixel data signals and driving voltages from the power supply. Gate driver ICs are connected to each other in series via signal lines mounted onto the gate PCB, receive control signals from the timing controller, and receive driving voltages from the power supply.

COG-type gate and data driver ICs are connected to each other via signal lines formed using a line-on-glass (LOG) technique. The signal lines are arranged on the lower glass substrate of the liquid crystal display panel. The signal lines may be formed using LOG technique and receive control signals from the timing controller and driving voltages from the power supply.

Even when the various driver ICs are connected to the liquid crystal display panel by the TAB technique, the LOG technique is typically adopted to eliminate the PCB and provide a thinner overall liquid crystal display. For example, signal lines connecting the gate driver ICs are relatively small and are provided directly on the liquid crystal display panel by the LOG technique. Accordingly, gate driver ICs are connected to liquid crystal display via the TAB technique, thereby eliminating the PCB system. That is, gate driver ICs are connected to each other in series via signal lines mounted on a lower glass substrate of the liquid crystal display panel, and receive control and driving voltage signals (e.g., gate driving signals).

Referring to FIG. 1, liquid crystal display including LOG-type signal lines (formed without the gate PCB) typically include a liquid panel 1, a plurality of data TCPs 8 connected between the liquid crystal display panel 1 and a data PCB 12, a plurality of gate TCPs connected to other side of the liquid crystal display panel 1, data driver ICs 10 mounted in the data TCPs 8, and gate driver ICs 16 arranged on the gate TCPs 14.

The liquid crystal display panel 1 includes a lower substrate 2 supporting various signal lines and a thin film transistor array, an upper substrate 4 supporting a color filter array, and liquid crystal injected between the lower substrate 2 and the upper substrate 4. The liquid crystal display panel 1 further includes a picture display area 21 including liquid crystal cells arranged provided at crossings between gate lines 20 and data lines 18.

Data pads and gate pads (not shown) are arranged at respective ends of data 18 and gate 20 lines. At an outer portion of the lower substrate 2, outside the picture display area 21 LOG signal line group 26 is positioned and transmits gate driving signals applied to the gate driver ICs 16.

Data TCPs 8 is mounted with the data driver IC 10 and includes input pads 24 and output pads 25 and electrically connected to the data driver IC 10 mounted thereon to the data PCB 12. The input pads 24 of the data TCP 8 are electrically connected to the output pads of the data PCB 12 while the output pads 25 of the data TCP 8 are electrically connected to the data pads arranged on the lower substrate 2. A first data TCP 8 is further provided with a gate driving signal transmission line group 22. The gate driving signal transmission group 22 electrically connects the LOG signal line group 26 on the lower substrate to the timing controller and power supply via the data PCB 12.

The data driver ICs 10 convert digital pixel data signals into analog pixel voltage signals and apply the analog pixel voltage signals to the data lines 18.

Each of the gate TCPs 14 includes a gate driving signal transmission line group 28 and output pads 30 electrically connecting the gate driver ICs 16 mounted thereon to the LOG signal line group 26 and the gate lines 20, respectively. The output pads 30 are electrically connected to the gate pads arranged on the lower substrate 2.

Each gate driver IC 16 sequentially applies a scanning signal (e.g., a gate high voltage signal (Vgh)) to each of the gate lines 20 in response to inputted control signals. Further, the gate driver ICs 16 apply a gate low voltage signal (Vgl) to each of the gate lines 20 that do not receive the gate high voltage signal (Vgh).

The LOG signal line group 26 typically consists of signal transmission lines for supplying direct current voltage signals, for example, gate high voltage signals (Vgh), gate low voltage signals (Vgl), common voltage signals (Vcom), ground voltage signals (GND), supply voltage signals (Vcc), and gate control signals. The gate control signals include, for example, gate start pulse (GSP), gate shift clock signals (GSC), and gate enable signals (GOE).

Individual signal lines within the LOG signal line group 26 are arranged in a fine parallel pattern and are provided within a narrow space, similar to a space where signal where signal lines in gate and data pads are positioned at outer portions of the picture display area 21. The individual signal lines within the LOG signal line group 26 are formed from a gate metal layer, which is similar to the gate lines 20. Metals having a relatively large resistivity (e.g., 0.046 ohms), such as AlNd can be used in forming the gate metal. The LOG signal line group 26 also includes a larger resistance component than the signal lines formed from a copper film at an existent gate PCB. As the resistance values of the signal transmission lines within the LOG signal line group 26 are proportional to their line lengths, the resistance of the signal transmission lines increases as the distance from the data PCB 12 increases. Accordingly, gate driving signals transmitted via the LOG signal line group become attenuated and distorted due to the variation in the line voltage value. As a result the quality of a picture displayed on the picture display area 21 is deteriorated.

For example, distortion of the gate low voltage signal (Vgl) applied via the LOG signal line group 26 affects the picture quality displayed within the picture display area 21. Gate low voltage signals (Vgl) maintain the pixel voltage applied to the liquid crystal cell between intervals when the gate high voltage (Vgh) is applied to the pixel. Accordingly, as the gate low voltage signal is distorted, the pixel voltage within the liquid crystal cell also becomes distorted.

Referring to FIG. 2, the LOG gate low voltage transmission lines VGLL supply gate low voltage signals (Vgl) and include a plurality of LOG gate low voltage transmission lines. These LOG gate low voltage transmission lines include first to fourth LOG gate low voltage transmission lines VGLL1 to VGLL4 and are connected between a first data TCP 8 and first to fourth gate TCPs 14A to 14D, respectively. The first to fourth LOG gate low voltage transmission lines VGLL1 to VGLL4 have line resistance values a, b, c, and d proportional to their respective line lengths, and are connected to each other in series via the first to fourth TCPs 14A to 14D. The line resistance values a, b, c, and d of the LOG gate low voltage transmission lines (VGLL1 to VGLL4) distort gate low voltage signals (Vgl) supplied to each gate driver 16.

For example, the first gate low voltage VGL1 is dropped in proportion to the first line resistance value (a) of the first LOG gate low voltage transmission line VGLL1. The first gate low voltage VGL1 is applied to the first gate driving IC 16 and gate lines at a first horizontal line block A.

The gate driver 16 mounted in the second gate TCP 14B is supplied with a second gate low voltage VGL1, which drops proportionally to the sum of the first and second line resistance values (a+b) of the first (VGLL1) and second (VGLL2) LOG gate low voltage transmission line, which are connected to each other in series. The second gate low voltage VGL2 is applied to the second gate driving IC 16 and gate lines at a second horizontal line block B.

The gate driver 16 mounted in the third gate TCP 14C and supplied with a third gate low voltage VGL3 is dropped in proportion to the sum of the first, second and third line resistance value (a+b+c) of the first (VGLL1), second (VGLL2) and third (VGLL3) LOG gate low voltage transmission lines, which are connected to each other in series. The third gate low voltage VGL3 is applied to the third gate driving IC 16 and gate lines at a third horizontal line block C.

The gate driver 16 mounted in the fourth gate TCP 14D and supplied with a fourth gate low voltage VGL4 which is dropped proportionally to the sum of the first, second, third, and fourth line resistance values (a+b+c+d) of the first (VGLL1), second (VGLL2), third (VGLL3), and fourth (VGLL4) LOG gate low voltage transmission lines, which are connected to each other in series. The fourth gate low voltage VGL4 is applied to the gate lines at a fourth horizontal line block D via the fourth gate driving IC 16.

A brightness difference is generated between the horizontal line blocks A to D connected to different gate driver ICs because of the difference among the gate low voltages VGL1 to VGL4. This brightness distortion causes a cross line (32) phenomenon dividing the screen when viewed by an observer and deteriorates the picture quality. Particularly, as it goes from the first gate driving IC 16 toward the fourth gate driving IC 16, line resistance values a, b, c and d of the LOG-type gate low voltage transmission lines VGLL are added to each other, thereby allowing the first to fourth gate low voltages VGL1 to VGL4 applied to the horizontal line blocks A to D to have a relationship of VGL1>VGL2>VGL3>VGL4.

In order to prevent a reduction of gate driving signals, particularly a gate low voltage caused by a line resistances of the LOG signal line group 26, a section area of the LOG signal line group 26 must be enlarged and/or the resistivity value thereof must be reduced. However, since the outer area of the picture display part 21 provided with the LOG signal line group 26 is confined, there exists a limit to enlarging a section view of the LOG signal line group 26. Furthermore, since the LOG-type signal line group 26 is formed from a gate metal layer, there are inherent limits in reducing the resistivity value.

As a result, a scheme capable of reducing a line resistance of the LOG-type signal line group 26 formed in a fine pattern within the confined area is required.

SUMMARY OF THE INVENTION

Accordingly, the present invention is directed to liquid crystal display panel of line-on-glass type that substantially obviates one or more of the problems due to limitations and disadvantages of the related art.

An advantage of the present invention is to provide a LOG liquid crystal display panel which is adaptive for reducing a line resistance of LOG signal line groups.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a line on glass type liquid crystal display panel according to an embodiment of the present invention includes a picture display part having a plurality of liquid crystal cells, each of which is arranged at each crossing area between gate lines and data lines; and line on glass type signal lines, being provided at an outer area of the picture display part by a line on glass system, for applying driving signals required for drive integrated circuits for driving the gate lines and the data lines and for connecting the drive integrated circuits to each other, wherein the line on glass type signal lines are separately provided at different substrates opposed to each other with having a liquid crystal therebetween.

In the line on glass type liquid crystal display panel, the line on glass type signal lines supply gate driving signals required for a gate drive integrated circuit for driving the gate lines and a common voltage required for a common electrode included in the picture display part.

A gate low voltage transmission line for supplying a gate low voltage signal, of the line on glass type signal lines, is provided at an outer area of a first substrate while gate driving signal lines for transferring the remaining gate driving voltage signals excluding the gate low voltage.

The line on glass type liquid crystal display panel further includes a connection dot for electrically connecting any one of the gate low voltage transmission line and the line on glass type signal lines for transferring the remaining gate driving signal at a second substrate.

The gate low voltage transmission line is provided such that it has a section area as large as possible at the outer area of the first substrate.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
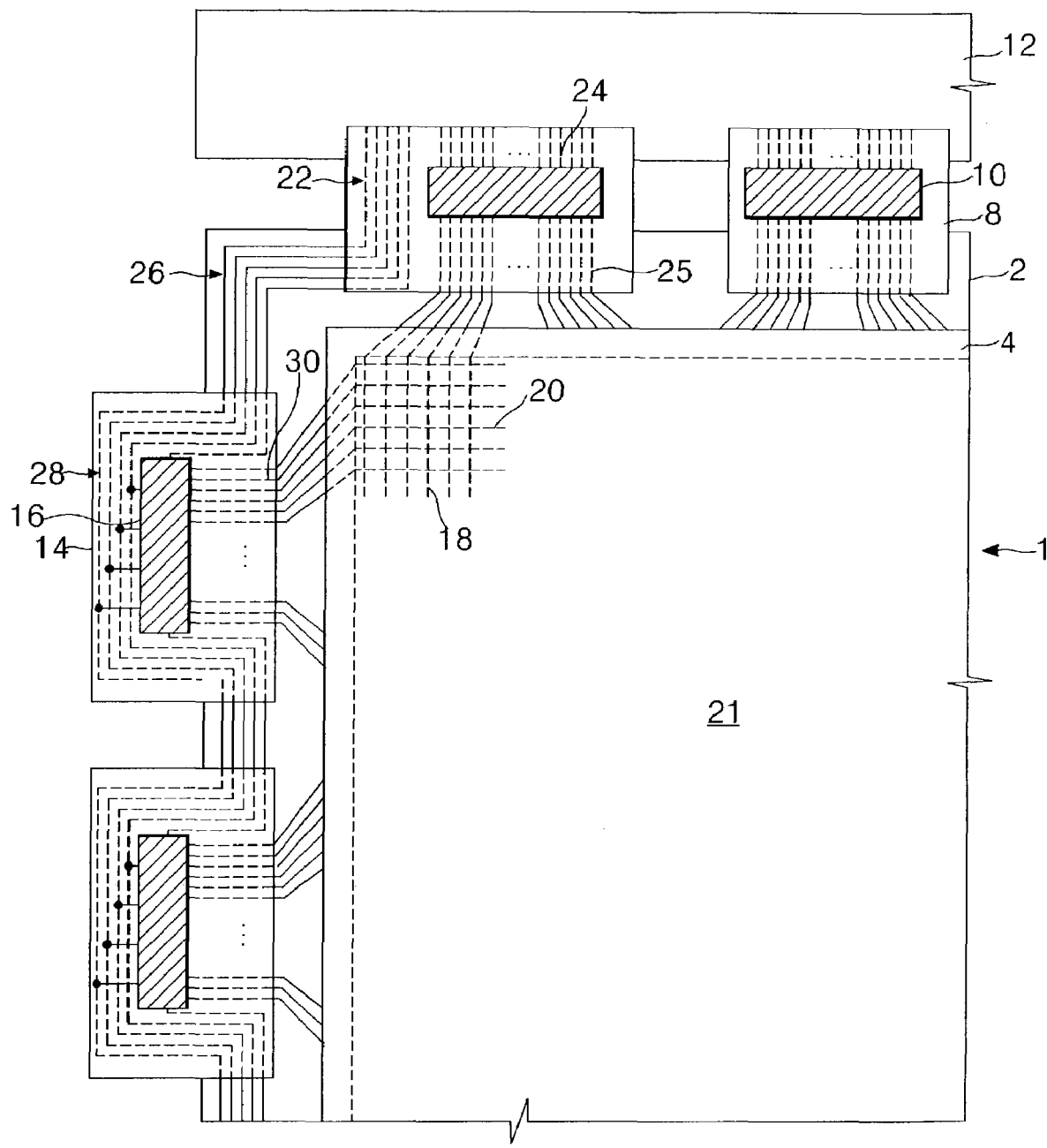
FIG. 1 is a schematic view of a related art line-on-glass type liquid crystal display.
Figure 2:
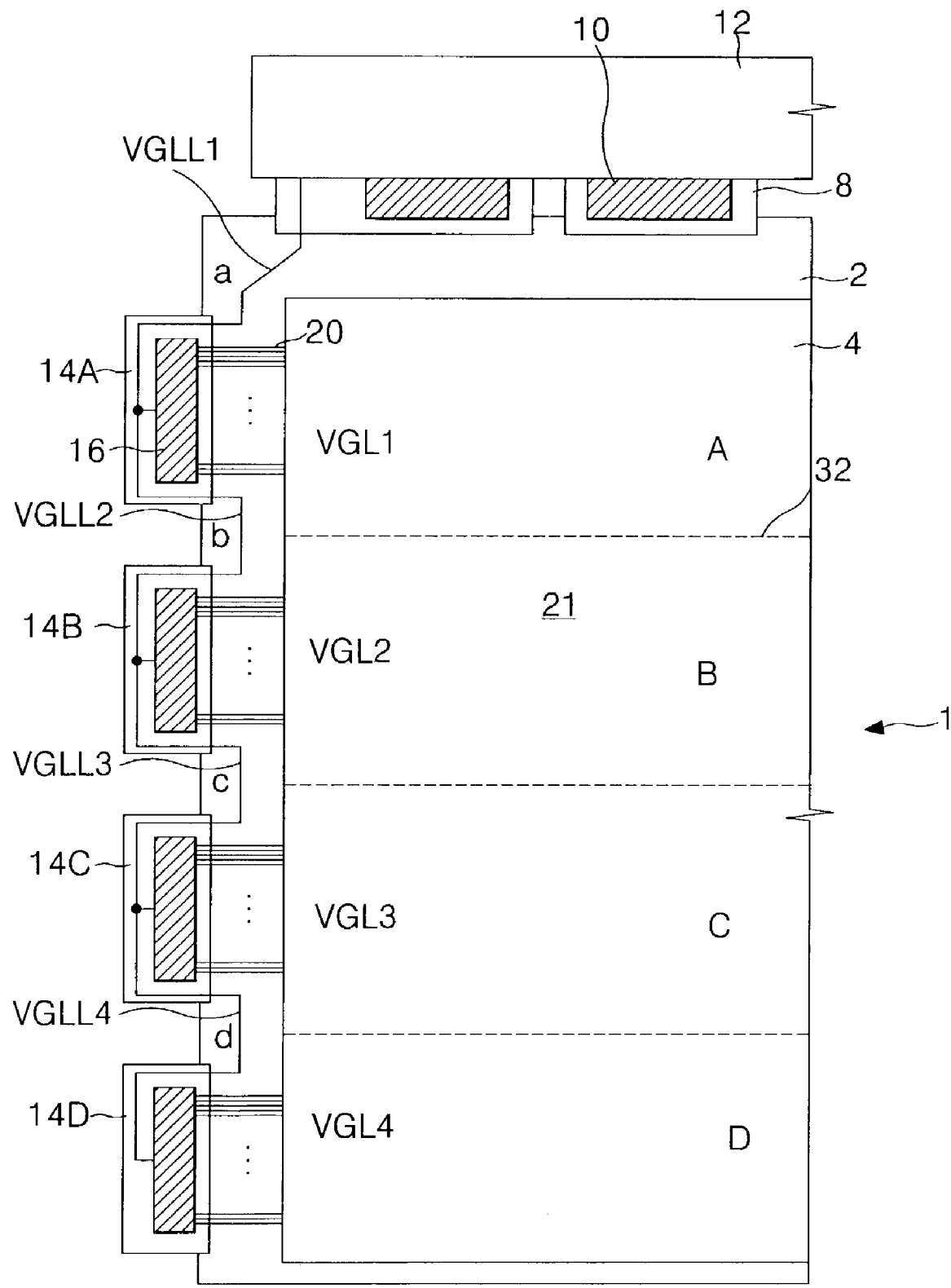
FIG. 2 is a schematic view for explaining a separation phenomenon between horizontal line blocks caused by a line resistance of the line-on-glass signal line group shown in FIG. 1.
Figure 3:
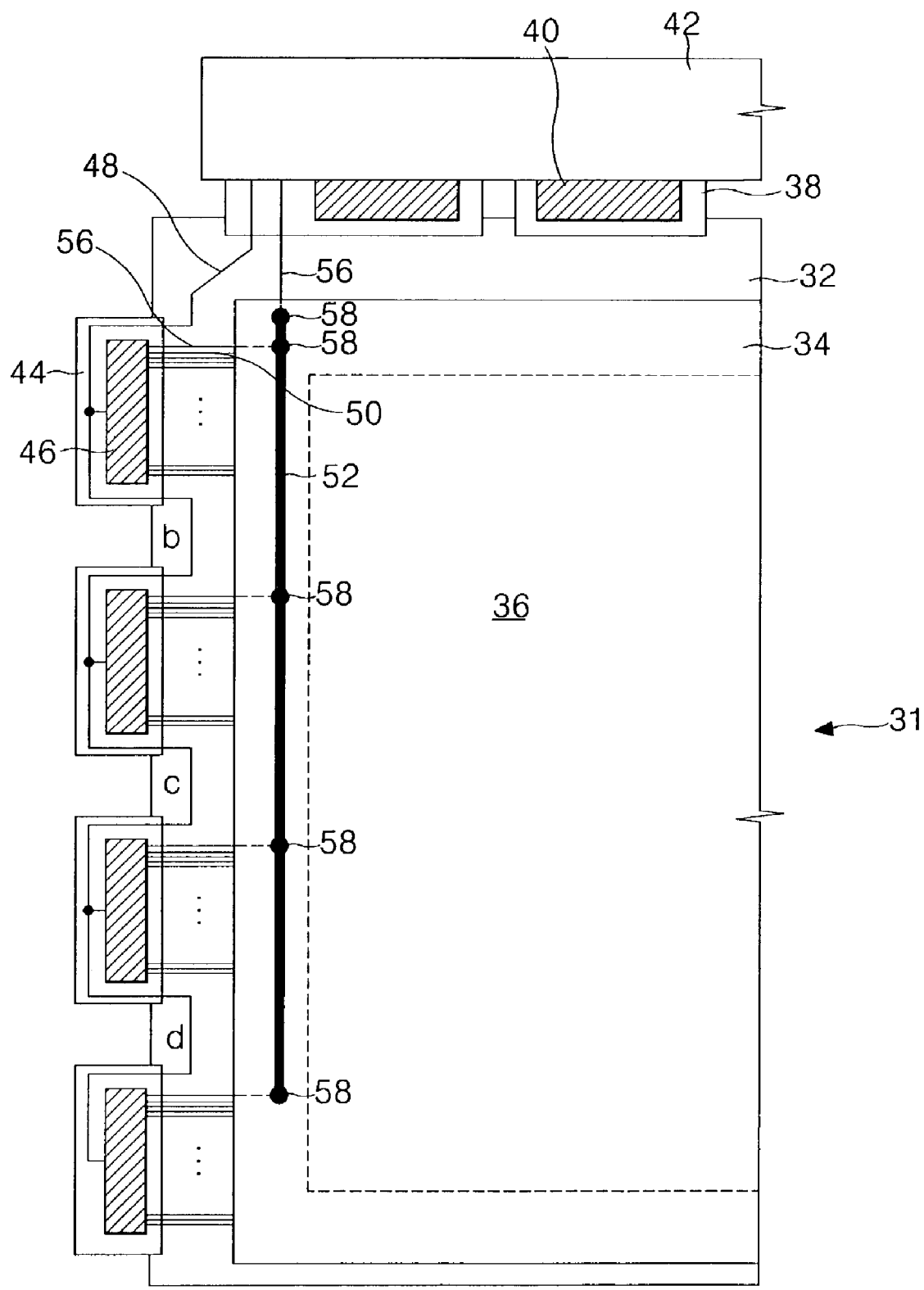
FIG. 3 is a schematic plan view of line-on-glass liquid crystal display panels according to an embodiment of the present invention.

FIG. 3 illustrates a LOG liquid crystal display according to an embodiment of the present invention.

The liquid crystal display device includes a liquid crystal display panel 31, a plurality of data TCPs 38 connected to the liquid crystal display panel 31, a data PCB 42, a plurality of gate TCPs 44 connected to a side of the liquid crystal display panel 31, data driving ICs 40 mounted on the data TCPs 38, gate driving ICs 46 mounted on the gate TCPs 44, and first 48 and second 52 LOG signal line groups. The LOG signal line groups are respectively provided on a lower 32 and upper 34 substrates for applying a gate driving signals to the gate driver ICs 46.

Figure 4:
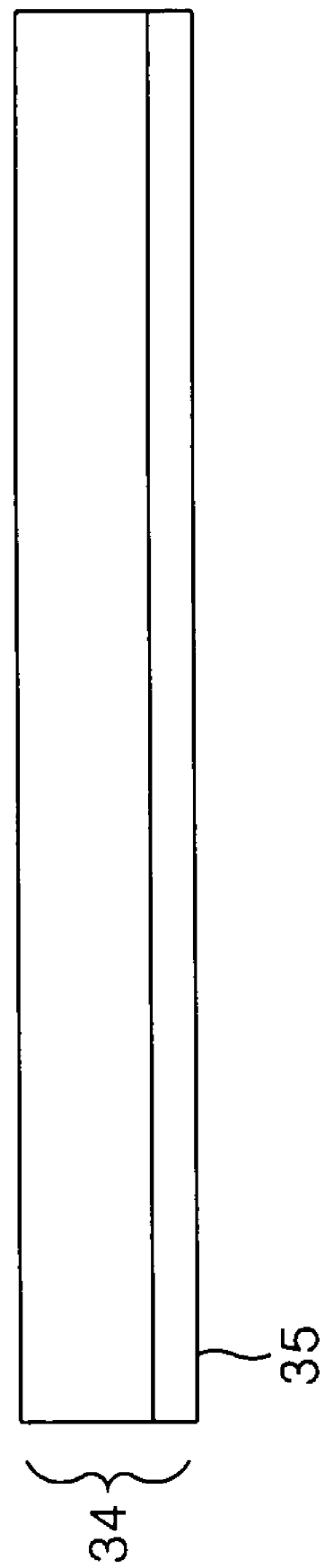
FIG. 4 is a schematic side view of an upper substrate provided with a color filter array.

The liquid crystal display panel 31 includes a lower substrate 32 provided with a plurality of signal lines and a switching array, for example, a thin film transistor array. As shown in FIG. 4, the upper substrate 34 is provided with a color filter array 35. Also the upper substrate is provided with liquid crystal injected between the lower 32 and upper 34 substrates. The liquid crystal display panel 31 is provided with a picture display area 36 that comprises liquid crystal cells provided at crossings of the gate lines and data lines for displaying a picture. Data pads (not labeled) are positioned at the outer area of the lower substrate 32. Further, a first LOG signal line group 48 for transmitting gate driving signals to the gate driver IC 46 is positioned at the outer area of the lower substrate 32. A second LOG signal line 52 is positioned at the outer area of the upper substrate 34. The second LOG signal line group 52 is connected with a connection dot 58 to any of the LOG lines 56.

The LOG signal line groups 48, 52 and 56 may include signal lines for supplying direct current (DC) voltage signals supplied from a power supply. The voltage signals include gate high voltage signals (VGH), gate low voltage signals (VGL), common voltage signals (VCOM), ground voltage signals (GND), and supply voltage signals (VCC), and gate control signals supplied from a timing controller. The gate control signals include a gate start pulse (GSP), a gate shift clock signal (GSC), and a gate enable signal (GOE).

The LOG signal line groups 48, 52 and 56 may be formed as large as possible within their respective confined area. Particularly, the second LOG signal line group 52 may be formed in a large size. The LOG signal line 52 is provided at the upper substrate 34 and is used as a gate low voltage signal line for transferring a gate low voltage (VGL). The line width of the gate low voltage signal line 52 is formed as large as possible. This is accomplished by using substantially the entire outer area of the upper substrate 34 when forming the gate low voltage line 52, thereby reducing the resistance values enough to improve the picture quality. As a result, the picture quality on the picture display part of the gate driving signals is greatly improved.

Additionally, the LOG signal lines within the LOG signal line group 48 for transferring the gate driving voltages other than the gate low voltage VGL also are formed with larger line widths than the prior art and their resistance values are reduced. The gate low voltage transmission line 52 is connected via the connection dots 58 to any one of the first LOG signal line groups 48 and 56 provided on the lower substrate. That is, the gate low voltage transmission line 52 connected to a connection dot 58 and to the LOG signal line 56 receives a gate low voltage. Further, the second LOG signal line 52 transmits the gate low voltage to the gate TCPs 44 and to each gate driver IC 46.

As described above, the LOG signal lines are formed to enlarge their sectional areas, thereby their resistance values are reduced and the signal attenuation is minimized. Particularly, the gate low voltage signal line, which has a great affect on picture quality is formed so that its line width is as large as possible within a confined outer area. Accordingly, the resistance value of the gate low voltage signal line is minimized and the difference in a gate low voltage supplied for each gate driver IC is also minimized. Thus, the cross-line phenomenon between the horizontal line blocks connected for each driver IC is reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A line-on-glass (LOG) liquid crystal display device, comprising:
    a first substrate a plurality of gate and data lines and a first LOG line group for transmitting gate driving signal a gate driver IC; and
    a second substrate including a color filter array, picture display area, and second LOG line group connected to the first LOG line group, wherein the second LOG line group includes a gate low voltage signal line having a resistance to prevent substantial voltage drop across the gate low voltage signal line, and the second LOG line group is arranged outside a picture display area of the second substrate.

2. The line-on-glass (LOG) liquid crystal display device of claim 1, wherein the first LOG line group includes signal lines connected to a PCB and TCP.

3. The line-on-glass (LOG) liquid crystal display device of claim 1, wherein the first LOG line group is connected to the second LOG line group with a connecting dot.

4. The line-on-glass (LOG) liquid crystal display device of claim 1, wherein the gate driving ICs are mounted on TCPs.

5. The line-on-glass (LOG) liquid crystal display device of claim 1, wherein the first LOG line groups is arranged on the outer periphery of the first substrate.

6. The line-on-glass (LOG) liquid crystal display device of claim 1, wherein the gate driver ICs includes a first, second, third and fourth gate driver IC connected to the second LOG line group at a plurality of connection dots.

\* \* \* \* \*